United States Patent
Inaba

(10) Patent No.: US 12,139,358 B2
(45) Date of Patent: Nov. 12, 2024

(54) MAGNETIC INK READING DEVICE AND PRINTER

(71) Applicant: TOSHIBA TEC KABUSHIKI KAISHA, Tokyo (JP)

(72) Inventor: Hiroyuki Inaba, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 650 days.

(21) Appl. No.: 17/191,193

(22) Filed: Mar. 3, 2021

(65) Prior Publication Data
US 2021/0387825 A1 Dec. 16, 2021

(30) Foreign Application Priority Data
Jun. 16, 2020 (JP) .................. 2020-103799

(51) Int. Cl.
*B41J 3/44* (2006.01)
*B41J 3/60* (2006.01)
(Continued)

(52) U.S. Cl.
CPC .............. *B65H 29/044* (2013.01); *B41J 3/44* (2013.01); *B41J 3/60* (2013.01); *B41J 13/0045* (2013.01);
(Continued)

(58) Field of Classification Search
CPC ... B41J 3/44; B41J 3/60; B41J 13/0045; B41J 13/009; B65H 2513/51; B65H 2513/512;
(Continued)

(56) References Cited

U.S. PATENT DOCUMENTS 6,257,783 B1 * 7/2001 Hanaoka .............. H04N 1/0058
400/582
6,862,428 B2 * 3/2005 Sasaki ...................... B41J 3/60
400/636
(Continued)

FOREIGN PATENT DOCUMENTS

| JP | 2002-361957 A | 12/2002 |
| JP | 2006-088688 A | 4/2006 |
| JP | 2017-222476 A | 12/2017 |

OTHER PUBLICATIONS

Notice of Reasons for Refusal mailed Mar. 12, 2024 in corresponding Japanese Patent Application No. 2020-103799, 7 pages (with Translation).

*Primary Examiner* — Luis A Gonzalez
(74) *Attorney, Agent, or Firm* — Kim & Stewart LLP

(57) ABSTRACT

A magnetic ink reading device includes a housing having a slot through which a medium is inserted, a roller driven by a motor by which the medium is conveyed along a conveyance path, one or more sensors arranged along the conveyance path and configured to detect the medium at one or more respective positions, a magnetic head configured to read a magnetic pattern formed on the medium with magnetic ink, and a controller. The controller is configured to control the motor to convey the medium inserted through the slot, measure a length in a conveyance direction of the medium using outputs from the sensors, and control the magnetic head to read the magnetic pattern from the medium while controlling the motor to continuously convey the medium for a period corresponding to the measured length.

20 Claims, 7 Drawing Sheets

(51) Int. Cl.
*B41J 13/00* (2006.01)
*B65H 29/04* (2006.01)
*B65H 29/12* (2006.01)
*B65H 29/30* (2006.01)
*G06V 30/224* (2022.01)

(52) U.S. Cl.
CPC ........... *B65H 29/125* (2013.01); *B65H 29/30* (2013.01); *G06V 30/2253* (2022.01); *B65H 2701/1912* (2013.01); *G03G 2215/0013* (2013.01)

(58) Field of Classification Search
CPC .... B65H 2701/1912; B65H 2701/1313; B65H 2701/1311; B65H 2701/1936; B65H 29/30; G03G 2215/0013
See application file for complete search history.

(56) References Cited

U.S. PATENT DOCUMENTS

| | | | | |
|---|---|---|---|---|
| 6,966,714 | B2* | 11/2005 | Harris | B41J 3/60 |
| | | | | 400/188 |
| 10,843,492 | B2* | 11/2020 | Nihashi | B65H 29/58 |
| 2012/0224202 | A1* | 9/2012 | Ito | B41J 11/008 |
| | | | | 358/1.12 |

* cited by examiner

MAGNETIC INK READING DEVICE AND PRINTER

CROSS-REFERENCE TO RELATED APPLICATIONS

This application is based upon and claims the benefit of priority from Japanese Patent Application No. 2020-103799, filed on Jun. 16, 2020, the entire contents of which are incorporated herein by reference.

FIELD

Embodiments described herein relate generally to a magnetic ink reading device and a printer.

BACKGROUND

In a printer device for printing on a sheet-like medium such as a check, a bill, or a ticket, such a medium can be inserted from a slot, and drawn into the printer device to print predetermined images and/or characters on the medium, and then the printed medium is discharged from the slot.

Some printers can print Magnetic Ink Character Recognition (MICR) characters with magnetic ink on the medium. Such MICR characters can be read by a magnetic ink reading device incorporated in the printer device or otherwise. For example, when a user inserts a check or the like into the printer device from the slot, the MICR characters on the check or the like are magnetized by a magnet. Next, the residual magnetic field generated by the magnetized MICR character can be read by a MICR head (also referred to as a magnetic head), and the MICR characters are identified from their magnetic characteristics and magnetic patterns. In this way, the MICR characters printed on the check or the like can be identified (that is, read by magnetic ink reading device incorporated in the printer device). Such a magnetic ink reading device may be incorporated in a printer used in an ATM (automated teller machine) or a POS (Point of Sales) terminal, for example.

The magnetic ink reading device includes a medium detection sensor. The medium detection sensor detects the presence or absence of the medium inserted into the slot or the like of the magnetic ink reading device. However, the medium detection sensor may in some instances erroneously detect a printed design on the background of the medium or a particularly dark portion of characters or images printed on the medium as the absence of the medium. When the medium detection sensor incorrectly detects the absence of the medium during the reading of the MICR characters by the MICR head, the magnetic reading device stops the reading operation, which may result in incomplete reading of the MICR characters.

DETAILED DESCRIPTION

In general, according to one embodiment, a magnetic ink reading device includes a housing having a slot through which a medium is inserted, a roller driven by a motor and through which the medium is conveyed along a conveyance path, one or more sensors arranged along the conveyance path and configured to detect the medium at respective positions, a magnetic head configured to read a magnetic pattern formed on the medium with magnetic ink, and a controller. The controller is configured to control the motor to convey the medium inserted through the slot, measure a length in a conveyance direction of the medium using outputs from the sensors, and control the magnetic head to read the magnetic pattern from the medium while controlling the motor to continuously convey the medium for a period corresponding to the measured length.

Figure 1:
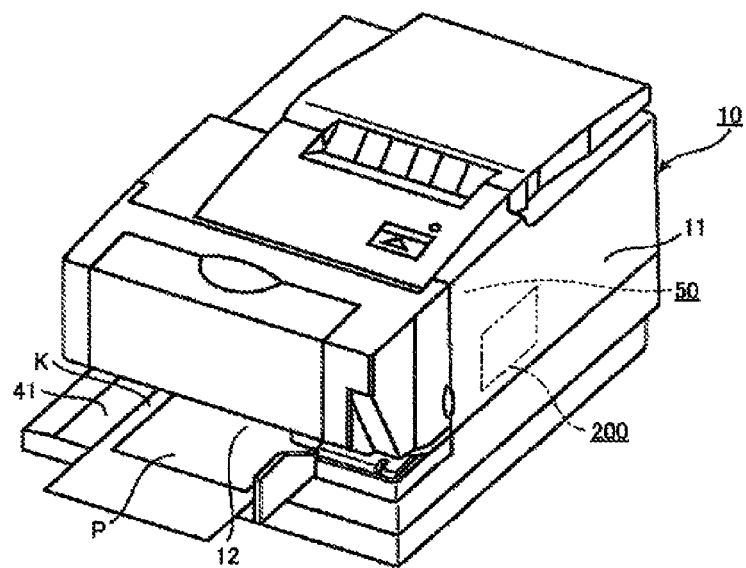
FIG. 1 is an external perspective view showing a printer including a magnetic ink reading device according to an embodiment.
Figure 2:
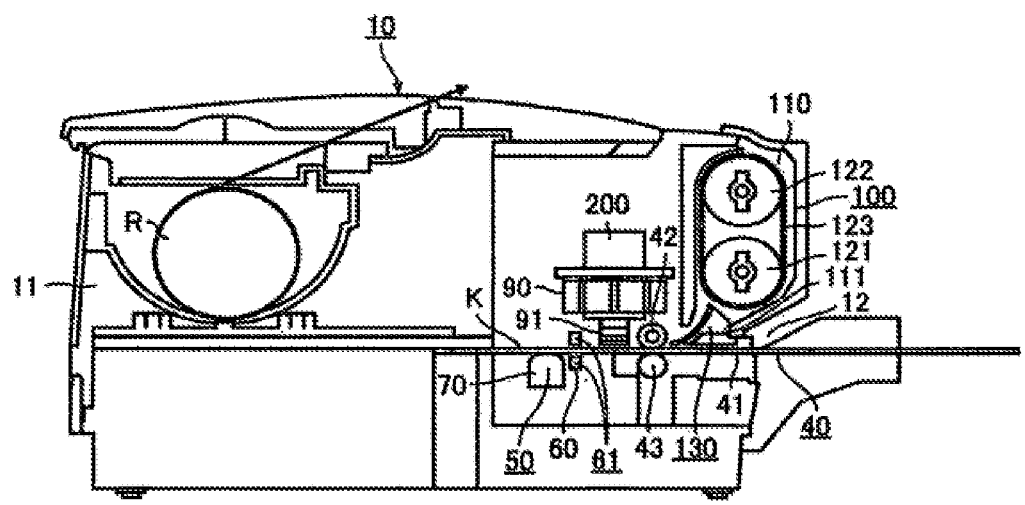
FIG. 2 is a longitudinal sectional view showing a printer according to an embodiment.
Figure 3:
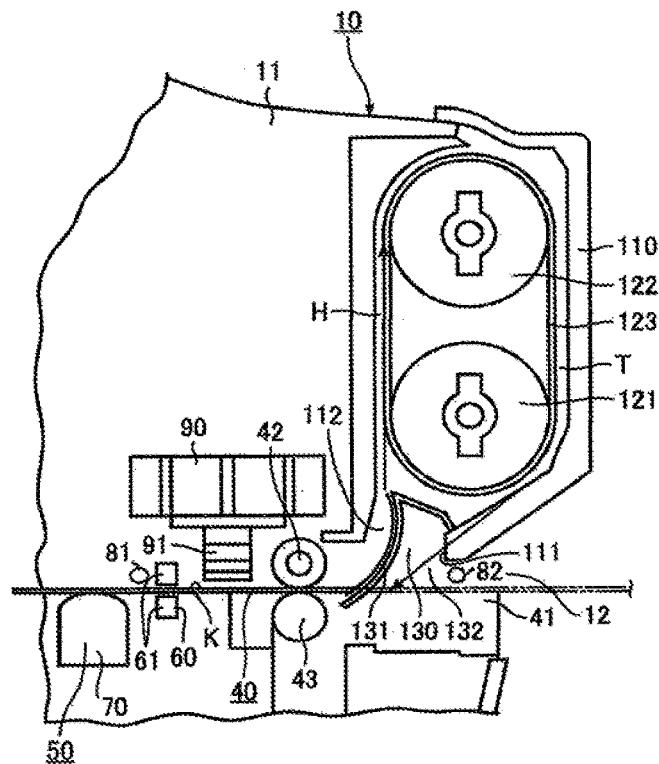
FIG. 3 is a longitudinal sectional view showing a magnetic ink reading device according to an embodiment.

Hereinafter, certain example embodiments will be described with reference to the drawings. FIG. 1 is an external perspective view of a printer 10 incorporating a magnetic ink reading device 50 according to an embodiment. FIG. 2 is a cross-sectional view showing a schematic configuration of the printer 10, and FIG. 3 is a cross-sectional view showing the magnetic ink reading device 50 incorporated in the printer 10.

The printer 10 is incorporated in or connected to, for example, an ATM installed in a bank or the like or a POS terminal installed in a store, a warehouse, or the like. In the drawing, P indicates a check, a sheet-shaped medium, and K indicates a conveyance path of the check P. The check P is a long single sheet extending along a longitudinal direction. On the check P, characters and graphics in ordinary ink and MICR characters in magnetic ink are printed.

The printer 10 includes a housing 11. The conveyance path K is formed in the housing 11. At one end (e.g., the right end in FIG. 2) of the conveyance path K, a medium exit and entrance 12 is provided for inserting and ejecting the check P from and to the outside. In the printer 10, the check P is inserted from the medium exit and entrance 12 with the front surface on which the MICR characters have been printed with magnetic ink facing downward in FIG. 1.

As shown in FIG. 2, a controller 200, a conveyance mechanism 40, and an MICR head 70 make up the magnetic ink reading device 50 in the housing 11. The housing 11 houses a print mechanism 90 and a reversal mechanism 100. The print mechanism 90 is provided closer to the medium exit and entrance 12 than the MICR head 70. The reversal mechanism 100 is provided closer to the medium exit and entrance 12 than the print mechanism 90. In addition, a receipt paper R wound in a roll shape (which is formed of thermal paper that changes color when heat is applied thereto to form characters and figures) is stored in the housing 11. The receipt paper R is printed with product information and payment information related to a purchased product, and is issued from the printer 10. The controller 200 has a function of cooperatively controlling the conveyance mechanism 40, the MICR head 70, the print mechanism 90, the reversal mechanism 100, and the like.

The conveyance mechanism 40 includes a table 41 on which the check P is conveyed in the left-right directions in FIG. 2. The direction along the upper surface of the table 41 is the conveyance path K. The conveyance mechanism 40 includes a plurality of rollers including a feed roller 42 and a pinch roller 43 arranged along the table 41.

The conveyance mechanism 40 includes a TOF (Top of Form (see FIG. 3)) sensor 81 that detects the front end of the check P conveyed along the conveyance path K, which is provided along the conveyance path K and in the vicinity of the MICR head 70. The TOF sensor 81 also detects the presence or absence of the check P at the position where the TOF sensor 81 is installed.

The conveyance mechanism. 40 further includes a BOF (Bottom of Form (see FIG. 3)) sensor 82 that detects the front end and rear end of the check P, which is provided along the conveyance path K and near the medium exit and entrance 12. The BOF sensor 82 also detects the presence or absence of the check P at the position where the BOF sensor 82 is installed.

In addition to the conveyance mechanism 40, the magnetic ink reading device 50 includes a magnetization mechanism 61 that magnetizes the magnetic ink of the check P on the conveyance path K, and an MICR head or a magnetic head 70 that is disposed near the downstream side of the magnetization mechanism 61 in the convey direction on the conveyance path K and reads the magnetized ink.

The magnetization mechanism 61 is installed in the vicinity of the TOF sensor 81. The magnetization mechanism 61 includes a magnet 60 that magnetizes the MICR characters printed on the check P conveyed along the conveyance path K. Although a magnetic pattern representing MICR characters is formed on the check P in advance using magnetic ink, since the magnetic force may be weak, the magnetic pattern is re-magnetized by the magnetization mechanism 61.

The MICR head 70 detects the residual magnetic force of the MICR characters, reads the MICR characters by the magnetic characteristics or magnetic patterns, and outputs electrical signals corresponding to read magnetic characteristics or patterns of the MICR characters to the controller 200. The magnetic characteristics or the magnetic patterns of the MICR characters are registered in advance in the controller 200 (see FIG. 5), and the MICR characters are identified by collating them. The MICR head 70 slides from the right side to the left side to detect the residual magnetic force of the MICR characters and read the magnetic characteristics or the magnetic patterns specific to the corresponding characters. Then, one character is specified by collating with a magnetic pattern stored in a pattern table 242 described later.

The print mechanism 90 includes an inkjet head 91 that performs printing as instructed by the controller 200. The inkjet head 91 is provided on the opposite side of the MICR head 70 across the conveyance path K.

The reversal mechanism 100 is a mechanism that reverses the front and back of the check P. As shown in FIG. 3, the reversal mechanism 100 includes a rectangular parallelepiped housing 110. Inside the housing 110, there are a reversal forward path H located on the left side in FIG. 3 and a reversal backward path T located on the right side in FIG. 3. An opening 111 is formed in a lower portion of the housing 110, and is to face the conveyance path K. On the MICR head 70 side of the opening 111, there is provided a reversal introduction port 112 for the check P to enter into the reversal forward path H.

A pair of rollers 121 and 122 are provided in the housing 110, and an endless belt 123 is rotated around the pair of rollers 121 and 122. The roller 121 is driven by a reversal motor 33 (see FIG. 5). Between the surface of the endless belt 123 and the inner wall of the housing 110, there are formed paths, the reversal forward path H and the reversal backward path T, through which the check P can pass.

A switching flapper 131 is disposed in the opening 111 of the housing 110. The switching flapper 131 is reciprocated between a position where it intersects conveyance path K and a position retracted upward from the conveyance path K by the operation of a switching solenoid 32 (see FIG. 5). When the switching flapper 131 is positioned at a position intersecting the conveyance path K, the check P printed by the inkjet head 91 is conveyed by the conveyance mechanism 40 to the reversal mechanism 100. When the switching flapper 131 is located at a position retracted upward from the conveyance path K, the check P printed by the inkjet head 91 is conveyed by the conveyance mechanism 40 along the conveyance path K to the medium exit and entrance 12.

Figure 4:
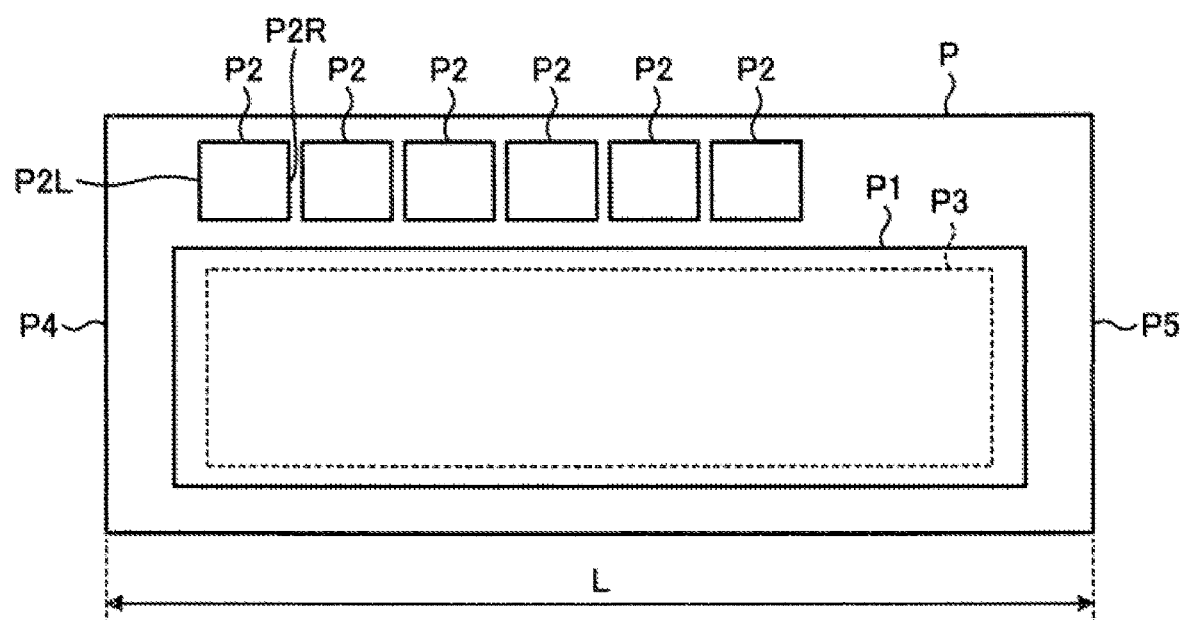
FIG. 4 is a diagram showing a medium on which MICR characters are printed.

The check P will now be described. As shown in FIG. 4, the check P is a long sheet having a length L in the longitudinal direction. The check P has a front surface and a back surface. The front surface has a print area P1. In the print area P1, a name of an issuer of the check P, a date of the issuance of the check P, the amount, and the like are printed by the inkjet head 91. The print area P1 is provided with a signature field for the issuer of the check P. The check P has a print area P2 on which one or more MICR characters are printed using magnetic ink. FIG. 4 shows an example in which six MICR characters are printed in the print area P2.

Each character or number printed in the printing area P2 is magnetized in a predetermined magnetic pattern representing the character or number. The MICR head 70 reads the magnetic pattern from the right end portion P2R to the left end portion P2L of each print area P2, so that the MICR characters printed on the print area P2 can be read as individual characters or numbers.

The check P has a print area P3 on the back surface. In the print area P3, register number information for identifying the POS terminal that issued the check P, person-in-charge number information that identifies the person who has issued the check P, bank information of the customer, and the like are printed by the inkjet head 91. The print area P1 may overlap the area of the print area P2. Since the MICR character printed on the print area P2 is printed with magnetic ink, even if the information printed on the print area P1 is overlapped, it can be accurately read.

Figure 5:
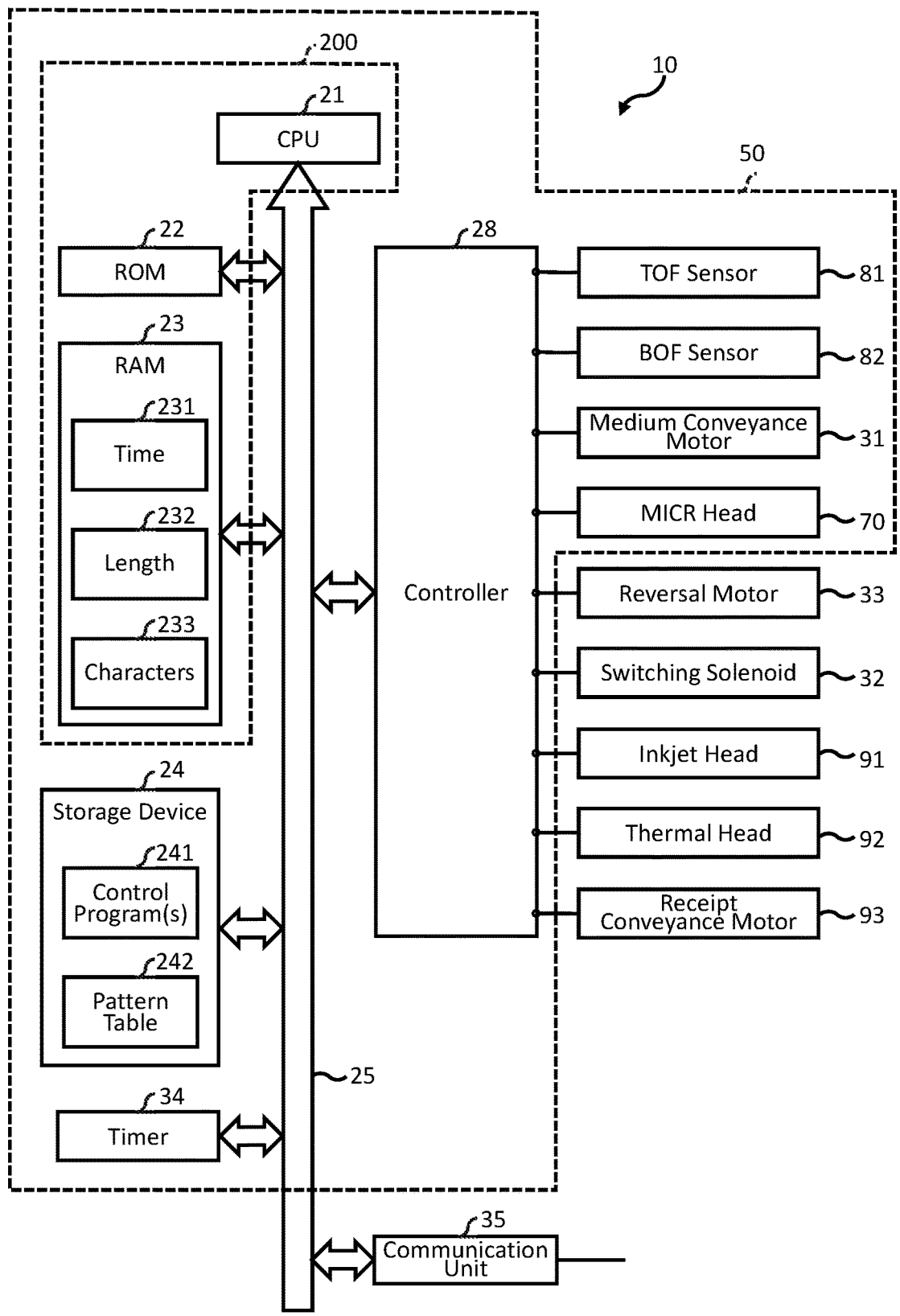
FIG. 5 is a hardware block diagram showing a printer according to an embodiment.

Hereinafter, a hardware configuration of the printer 10 will be described. FIG. 5 is a block diagram illustrating a hardware configuration of the printer 10. As illustrated in FIG. 5, the printer 10 includes a CPU (Central Processing Unit) 21, a ROM (Read Only Memory) 22, a RAM (Random Access Memory) 23, a storage device 24, and the like. The CPU 21 is a processor configured control the entire operations of the printer 10. The ROM 22 stores various programs. The RAM 23 temporarily stores programs and various kinds of information. The storage device 24 stores various programs. The CPU 21, the ROM 22, the RAM 23, and the storage device 24 are connected to each other via a bus 25. The CPU 21, the ROM 22, and the RAM 23 make up the controller 200. That is, the controller 200 executes a control process related to the printer 10, which will be described later, by operating in accordance with one or more control programs stored in the ROM 22 or the storage device 24 and loaded into the RAM 23.

The RAM 23 includes a time storage section 231, a length storage section 232, and a character storage section 233. The time storage section 231 stores the time from when the TOF sensor 81 detects the front end P4 (see FIG. 8) of the check P to when the BOF sensor 82 detects the rear end P5 (see FIG. 8) of the check P. The length storage section 232 stores the length L of the check P. The length L of the check P is calculated based on a speed at which the conveyance mechanism 40 conveys the check P, a time stored in the time storage section 231, and a distance D between the TOF sensor 81 and the BOF sensor 82 (see FIG. 8). The character storage section 233 stores the MICR characters read by the MICR head 70.

The storage device 24 includes a nonvolatile storage device such as an HDD (Hard Disc Drive) or a flash memory in which stored information is held even when the power of the printer 10 is turned off. The storage device 24 includes a control program section 241 and a pattern table 242. The control program section 241 stores one or more control program(s) for controlling the printer 10. The pattern table 242 stores magnetic patterns for identifying corresponding MICR characters. The controller 200 can recognize the MICR characters printed on the print area P2 by collating each magnetic pattern read by the MICR head 70 with one of the magnetic patterns stored in the pattern table 242.

The controller 200 is connected to the TOF sensor 81, the BOF sensor 82, a medium conveyance motor 31, the switching solenoid 32, the reversal motor 33, the MICR head 70, the inkjet head 91, a thermal head 92, and a receipt conveyance motor 93 via the bus 25 and a controller 26. The TOF sensor 81 is, for example, a reflective photo sensor, and detects the front end P4 of the check P at the location where the TOF sensor 81 is installed. The TOF sensor 81 detects the presence or absence of the check P at the installation position of the TOF sensor 81. The BOF sensor 82 is, for example, a reflective photo sensor, and detects the rear end P5 of the check P at the location of the BOF sensor 82. The BOF sensor 82 detects the presence or absence of the check P at the location of the BOF sensor 82.

The medium conveyance motor 31 rotates the feed roller 42 to move the check P inserted into the medium exit and entrance along the conveyance path K. Specifically, the medium conveyance motor 31 conveys the check P inserted into the medium exit and entrance 12 to a position facing the MICR head 70. The medium conveyance motor 31 conveys the check P from the position facing the MICR head 70 to the medium exit and entrance 12. The MICR head 70 reads the MICR characters printed on the print area P2 when the check P is discharged. The medium conveyance motor 31 also moves the check P in order to print characters and graphics on the print area P3 of the check P using the inkjet head 91. The medium conveyance motor 31 also moves the check P to the reversal introduction port 112 in the reversal mechanism 100.

The switching solenoid 32 reciprocates the switching flapper 131 between a position where the switching flapper 131 intersects the conveyance path K and a position where the switching flapper 131 is retracted upward from the conveyance path K. When the switching solenoid 32 moves the check P to the reversal mechanism 100, the switching solenoid 32 moves the switching flapper 131 to the position where the switching flapper 131 intersects the conveyance path K. The switching solenoid 32 moves the switching flapper 131 to the position retracted upward from the conveyance path K when conveying the check P reversed by the reversal mechanism 100 back to the conveyance path K and when moving the check P to the medium exit and entrance 12.

By rotating the rollers 121 and 122 and driving the endless belt 123, the reversal motor 33 moves the check P that has moved into the reversal mechanism 100 from the reversal forward path H to the reversal backward path T, and conveys the check P from the opening 111 to the conveyance path K.

The MICR head 70 reads the MICR characters printed on the print area P2. The inkjet head 91 ejects ink to the print area P1 and the print area P3 to print characters and/or figures. The thermal head 92 includes heat generation elements arranged along a line, and applies heat to the receipt paper R being conveyed to print the characters and/or figures. The receipt conveyance motor 93 conveys the receipt paper R. The receipt paper R on which the characters and/or figures are printed is issued and ejected from the housing 11 to the outside.

The controller 200 is connected to a timer 34 via the bus 25. The timer 34 measures time. The timer 34 measures the time from when the TOF sensor 81 detects the front end P4 of the check P to when the BOF sensor 82 detects the rear end P5 of the check P.

The controller 200 is connected to a communication unit 35 via the bus 25. The communication unit 35 is a network interface circuit connected to, for example, a POS terminal via a communication line. The communication unit 35 receives transaction information related to sales of a product from the POS terminal. The transaction information is used as information printed on the check P or the receipt paper R.

As shown in FIG. 5, the components of the printer 10 excluding the reversal motor 33, the switching solenoid 32, the inkjet head 91, the thermal head 92, the receipt convey motor 93, and the communication unit 35 make up the magnetic ink reading device 50.

In the printer 10 configured in this manner, magnetic ink reading and printing is performed on the check P in the following manner. An operator inserts the check P into the medium exit and entrance 12 with the back surface facing upward. The controller 200 of the printer 10 controls the medium conveyance motor 31 to pull the check P along the conveyance path K. At this time, the controller 200 measures the length L of the check P in the carried-in direction. The print area P2 of the check P is magnetized. Next, the controller 200 controls the MICR head 70 to read the MICR characters printed on the print area P2 while controlling the medium conveyance motor 31 to move the inserted check P towards the medium exit and entrance 12. Next, the controller 200 controls the medium conveyance motor 31 to pull the check P again. The controller 200 then controls the inkjet head 91 to print information in the print area P3 on the back surface of the check P. When there is no information to be printed in the print area P1 on the front surface, the controller 200 controls the medium conveyance motor 31 to move the check P toward the medium exit and entrance 12 and eject the check P. On the other hand, if there is information to be printed on the front surface, the controller 200 controls the switching flapper 131 to move to the position where it intersects the conveyance path K, controls the reversal motor 33 to pass the check P through the reversal mechanism 100 and reverse the front and back of the check P. Thereafter, the controller 200 controls the inkjet heat 91 to print the information on the front surface of the check P, controls the medium conveyance motor 31 to move the check P towards the medium exit and entrance 12 and discharge the check P.

Figure 6:
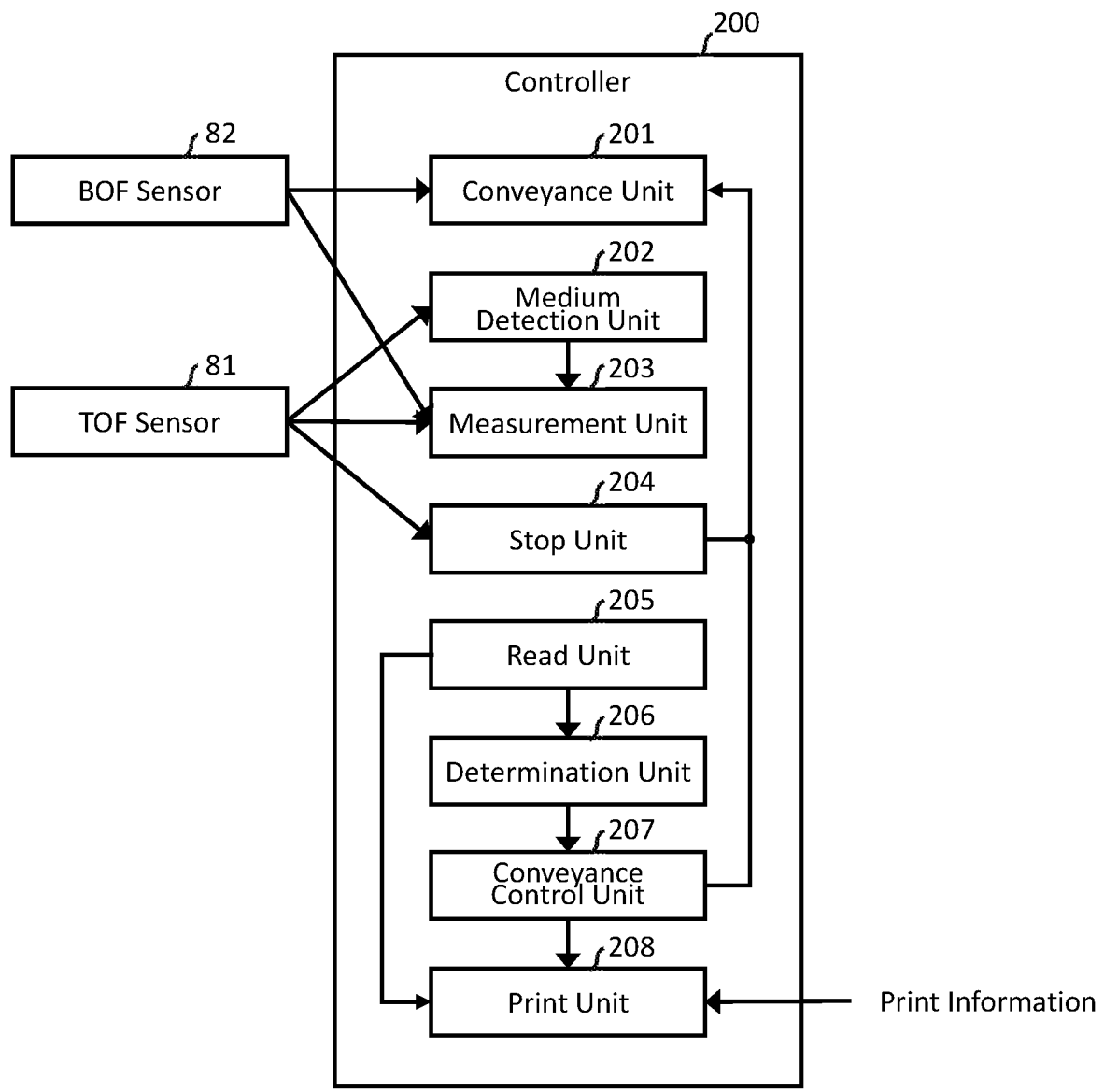
FIG. 6 is a functional block diagram showing a printer according to an embodiment.

Hereinafter, a functional configuration of the printer 10 will be described. FIG. 6 is a functional block diagram showing the printer 10. As shown in FIG. 6, the controller 200 of the printer 10 performs functions of a conveyance unit 201, a medium detection unit 202, a measurement unit 203, a stop unit 204, a read unit 205, a determination unit 206, a conveyance control unit 207, and a print unit 208 according to the control programs stored in the ROM 22 or the storage device 24.

The conveyance unit 201 controls the medium conveyance motor 31 to reciprocate the check P inserted into the medium exit and entrance 12 along the conveyance path K provided in the housing 11. Specifically, when the BOF sensor 82 detects the front end P4 of the check P, the conveyance unit 201 drives the medium conveyance motor 31 to convey the check P inserted into the medium exit and entrance 12 forward along the conveyance path K provided in the housing 11, and then convey the check P backward to the medium exit and entrance 12 while controlling the MICR head 70 to read the information printed on the check P.

The medium detection unit 202 detects the presence or absence of the check P in the conveyance path K. Specifically, the medium detection unit 202 detects the presence or absence of the check P in the conveyance path K based on an output indicating whether the TOF sensor 81 has detected the check P.

The measurement unit 203 measures the length L of the detected check P in the conveyance direction. For example, the measurement unit 203 measures the length L of the check P in the conveyance direction based on the output from the TOF sensor 81 detecting the front end P4 of the check P and the output from the BOF sensor 82 detecting the rear end P5 of the check P. More particularly, the measurement unit 203 calculates the length L of the check P in the conveyance direction based on: (a) the conveyance time of the check P that can be acquired from the output from the TOF sensor 81 detecting the front end P4 of the check P and the output from the BOF sensor 82 detecting the rear end P5 of the check P, (b) the known distance D between the TOF sensor 81 and the BOF sensor 82, and (c) the predetermined conveyance speed of the check P.

The stop unit 204 instructs the conveyance unit 201 to stop the conveyance of the check P when the medium detection unit 202 detects that there is no check P. Specifically, the stop unit 204 instructs the conveyance unit 201 to stop the conveyance of the check P when the medium detection unit 202 detects the absence of the check P in the conveyance path K based on the output of the TOF sensor 81 detecting the absence of the check P.

The read unit 205 controls the MICR head 70 to read information printed on the check P disposed in the conveyance path K. Specifically, the read unit 205 controls the MICR head 70 disposed in the conveyance path K to read information printed with magnetic ink on the print area P2 of the check P conveyed on the backward path of the conveyance path K.

When the information printed on the check P is read, the determination unit 206 determines whether the check P has been conveyed for the length L measured by the measurement unit 203. Specifically, the determination unit 206 determines whether the check P has been conveyed for the length L measured by the measurement unit 203 while the read unit 205 is reading information printed on the check P with magnetic ink.

While the check P is being conveyed for the read unit 205 to read the printed information, the conveyance control unit 207 controls the conveyance unit 201 to continue the conveyance of the check P and the read unit 205 to read the information without instructing the stop unit 204 to stop the conveyance even if the medium detection unit 202 detects that there is no check P. Specifically, in order to read information printed with magnetic ink by the read unit 205, even if the TOF sensor 81 detects no check P and the medium detection unit 202 detects no check P, the conveyance control unit 207 continues the conveyance of the check P and reading of the information while the check P has not been conveyed by a distance equal to the length L of the check P.

The print unit 208 performs predetermined printing on the check P based on the information read by the read unit 205. Specifically, the print unit 208 acquires print information related to the information read by the read unit 205, and controls the inkjet head 91 to perform print process on the check P. The print unit 208 performs the printing on one or both surfaces of the check P. When printing is performed on both surfaces of the check P, the conveyance unit 201 performs a reverse process to reverse the back surface and front surface of the check P.

Figure 7:
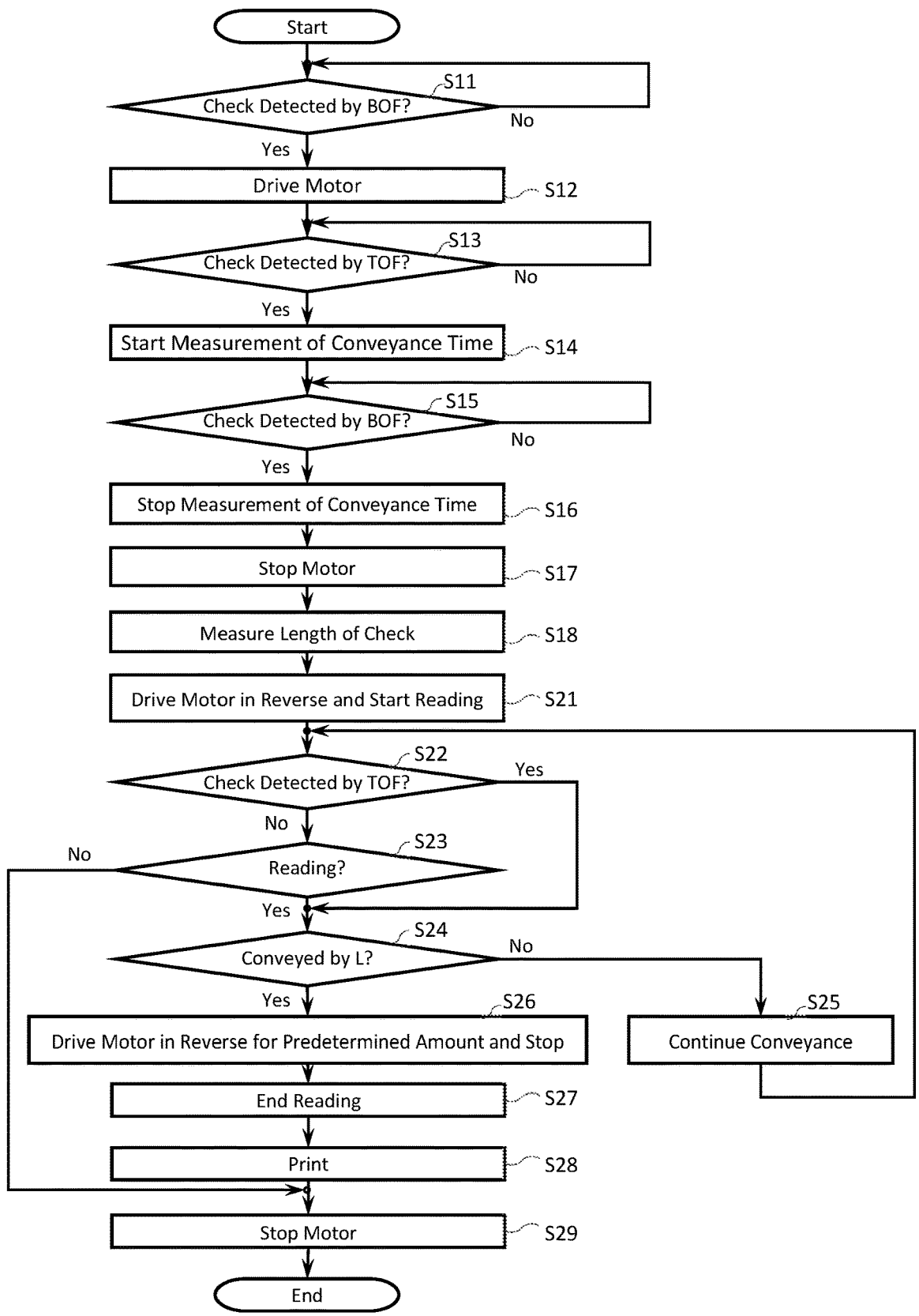
FIG. 7 is a flowchart showing control processing of a printer according to an embodiment.

Hereinafter, a control of the printer 10 will be described. FIG. 7 is a flowchart illustrating control processing performed by the printer 10. As shown in FIG. 7, the controller 200 of the printer 10 determines whether the BOF sensor 82 has detected a check P inserted from the medium exit and entrance 12 (S11). The conveyance unit 201 waits until the check P is detected (No in S11), and when the check P is detected (Yes in S11), the conveyance unit 201 drives the medium conveyance motor 31 forward (S12). Then, the feed roller 42 rotates, and the check P is conveyed along the forward path of the conveyance path K.

Subsequently, the medium detection unit 202 determines whether the TOF sensor 81 has detected the front end P4 of the check P (S13). The measurement unit 203 waits until the front end P4 of the check P is detected (No in S13), and when the front end P4 of the check P is detected (Yes in S13), the measurement unit 203 starts measuring the conveyance time of the check P (S14). Specifically, the measurement unit 203 activates the timer 34 and starts measuring the conveyance time of the check P.

Figure 8:
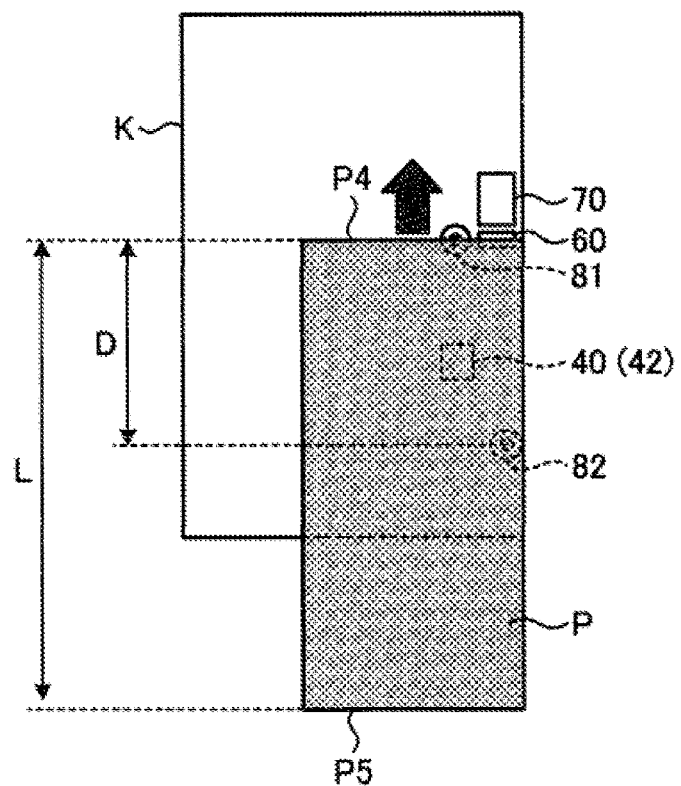
FIG. 8 is an explanatory view showing the front end of a medium detected in a magnetic ink reading device according to an embodiment.

FIG. 8 is a diagram showing the start of the measurement of the conveyance time of the check P in S14. In FIG. 8, the TOF sensor 81 is located on the downstream side of the BOF sensor 82 in the forward convey direction of the check P. The TOF sensor 81 and the BOF sensor 82 are disposed at a distance D from each other along the conveyance direction of the check P. When the check P is inserted and the BOF sensor 82 detects the front end P4 of the check P, the feed roller 42 rotates. When the check P is further inserted, the check P is carried in and held between the feed roller 42 and the pinch roller 43, and thereafter, the check P is in the forward path by the rotation of the feed roller 42. When the TOF sensor 81 detects the front end P4 of the check P, the measurement unit 203 starts measuring the conveyance time of the check P.

The description returns to FIG. 7. Next, the medium detection unit 202 determines whether the BOF sensor 82 has detected the rear end P5 of the check P (S15). The measurement unit 203 waits until the BOF sensor 82 detects the rear end P5 of the check P (No in S15), and if the BOF sensor 82 has detected the rear end P5 of the check P (Yes in S15), the measurement unit 203 ends the measurement of the conveyance time of the check P started at S14 (S16). Specifically, the measurement unit 203 stops the timer 34 and ends the measurement of the conveyance time of the check P. Then, the measurement unit 203 stores the conveyance time measured by the timer 34 in the time storage section 231 of the RAM 23.

Figure 9:
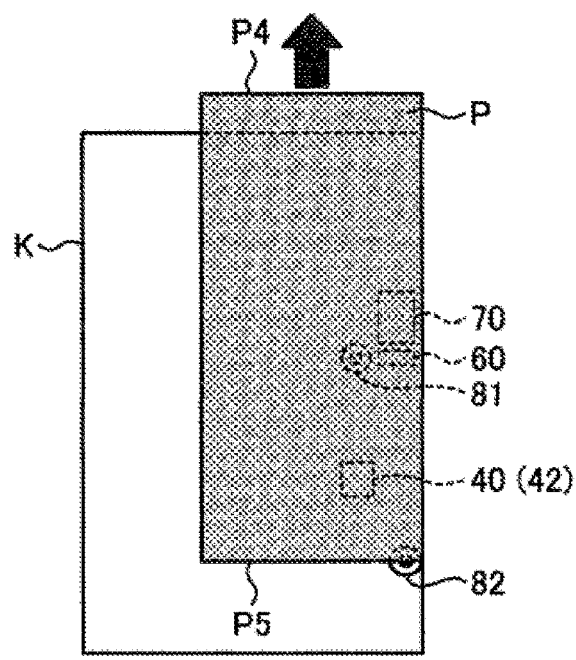
FIG. 9 is an explanatory view showing the rear end of the medium detected in a magnetic ink reading device according to an embodiment.

FIG. 9 is a diagram showing the end of the measurement of the conveyance time of the check P in S16. In FIG. 9, the BOF sensor 82 detects the rear end P5 of the check P.

The description returns to FIG. 7. Next, the controller 200 drives the medium conveyance motor 31 to convey the check P a predetermined distance in the forward direction, and then stops the medium conveyance motor 31 (S17).

Figure 10:
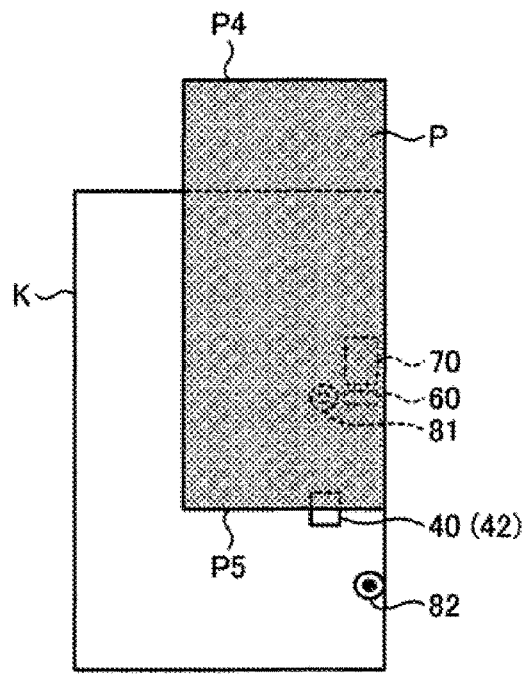
FIG. 10 is an explanatory view showing the start of reading of MICR characters in a magnetic ink reading device according to an embodiment.

FIG. 10 is a diagram illustrating a state in which the medium conveyance motor 31 is stopped in S17. In FIG. 10, the check P is located at a start position where the MICR head 70 starts reading MICR characters printed on the print area P2 of the check P. During the period from rotating the medium conveyance motor 31 in S12 to stopping the medium conveyance motor 31 in S17, the MICR characters printed on the print area P2 are magnetized by the magnetization mechanism 61 while the check P is conveyed in the forward direction.

The description returns to FIG. 7. Next, the measurement unit 203 measures or calculates the length L of the check P in the conveyance direction (S18). In particular, the measurement unit 203 measures or calculates the length L of the check P based on: (a) the time period during which the check P was conveyed between S14 and S17, which was measured by the timer 34 and has been stored in the time storage section 231 of the RAM 23, (b) the predetermined conveyance speed of the check P, and (c) the known distance D between the TOP sensor 81 and the BOF sensor 82. Then, the measurement unit 203 stores the measured length L of the checks P in the length storage section 232 of the RAM 23 (S18).

From here on, the MICR characters are read while the check P is conveyed in the backward path. That is, the conveyance unit 201 drives the medium conveyance motor 31 in reverse to convey the check P in the backward direction (S21). The read unit 205 controls the MICR head 70 to start reading the MICR characters (S21). When the MICR characters are being read, the read unit 205 sets a reading flag to "1", which is stored in the RAM 23, for example. In addition, the controller 200 measures the distances that the check P has been conveyed after the S21 process based on the drive amount of the medium conveyance motor 31.

The medium detection unit 202 then determines whether the TOF sensor 81 has detected a check P (S22). If it is determined that the check P is not detected by the TOF sensor 81 (No in S22), the determination unit 206 checks the reading flag to determine whether the read unit 205 is reading the MICR characters (S23). When the MICR characters are being read by the read unit 205 (Yes in S23), the determination unit 206 determines whether the check P has been conveyed by the length L stored in the length storage section 232 since the start of the S21 process (S24). If the check P has not been conveyed by the length L (No in S24), the conveyance control unit 207 controls the medium conveyance motor 31 to continue to convey the check P (S25). That is, even when the TOF sensor 81 does not detect the check P, the conveyance control unit 207 continues the conveyance of the check P by the conveyance unit 201 without stopping the conveyance of the check P by the stop unit 204. The reading of the MICR characters by the read unit 205 is also continued (S25). Then, the controller 200 returns to the S22.

The TOF sensor 81 may detect the absence of the check P depending on characters, graphics, background, and the like printed on the check P even if the check P is present at the installation position of the TOF sensor 81. Therefore, when the TOF sensor 81 detects the absence of the check P during reading of the MICR characters in S22 to S24, it is determined whether the check P has been conveyed by the length L of the check P from the S21 process.

On the other hand, if the check P has been conveyed by the length L (Yes in S24), the controller 200 drives the medium conveyance motor 31 to convey the check P backward by a predetermined length and stops the conveyance (S26). Then, the controller 200 controls the MICR head 70 to end the reading of the MICR characters (S27). In S27, the controller 200 stores the read MICR characters in the character storage section 233 of the RAM 23.

Figure 11:
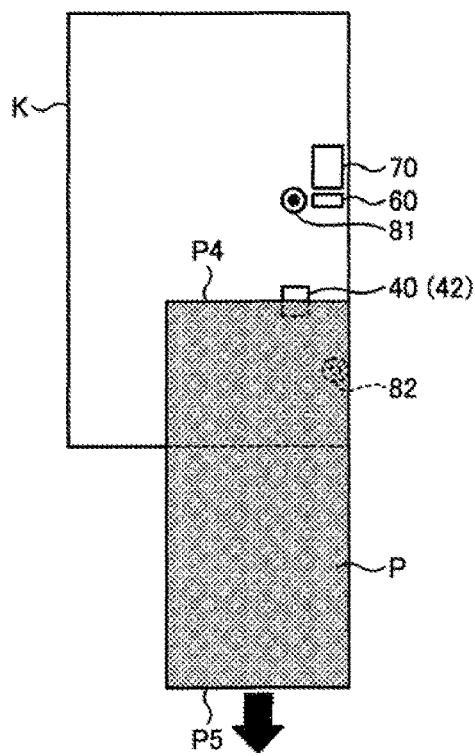
FIG. 11 is an explanatory view showing the end of reading of MICR characters in a magnetic ink reading device according to an embodiment.

FIG. 11 shows a diagram showing the state in which the process of S26 and the processing of S27 are performed. That is, the front end P4 of the check P is conveyed backward to the position of the conveyance mechanism 40 and then the conveyance is stopped when the reading of the MICR characters is completed.

The description returns to FIG. 7. In S22, when the medium detection unit 202 determines that the TOF sensor 81 is detecting the check P (Yes in S22), the determination in S24 is performed without the determination in S23. When it is determined in S23 that the MICR head 70 is not reading MICR characters (No in S23), the conveyance unit 201 instructs the stop unit 204 to stop the conveyance of the check P (S29).

After the end of the reading in S27, the controller 200 performs print process on the check P (S28). First, printing is performed on the back surface of the check P. In this case, the print unit 208 controls the inkjet head 92 to print on the print area P3 while controlling the medium conveyance motor 31 to convey the check P forward or convey the check P backward after conveying the check P forward. If printing is to be performed only on the back surface of the check P, the controller 200 controls the medium conveyance motor 31 to eject the printed check P from the medium exit and entrance 12.

On the other hand, if printing is also to be performed on the front surface of the check P, the controller 200 causes the check P to proceed to the reversal mechanism 100. That is, the controller 200 drives the switching solenoid 32 to move the switching flapper 131 to a position where the switching flapper 312 intersects with the conveyance path K. Then, the conveyance unit 201 conveys the check P printed on the back surface to the reverse introduction port 112 along the switching flapper 131. The check P is conveyed by the rotating endless belt 123 in the reversal forward path H and the reverse backward path T, and the check P that has been reversed is conveyed from the opening 111 to the conveyance path K. The controller 200 performs print process on the inverted check P in the print area P1 on the front surface using the inkjet head 91. Then, the controller 200 controls the medium conveyance motor 31 to eject the check P with the printed front surface from the medium exit and entrance 12.

When the TOF sensor 81 no longer detects the check P during printing on the check P, the conveyance unit 201 instructs the stop unit 204 to stop the conveyance of the check P (S29). The controller 200 ends the process after the process of S28 and S29.

The magnetic ink reading device 50 according to the aforementioned embodiments includes (a) the housing 11 having the medium exit and entrance 12 for inserting and removing the check P printed with magnetic ink, (b) the conveyance unit 201 for reciprocating the check P inserted into the medium exit and entrance 12 along the conveyance path K provided in the housing 11, (c) the medium detection unit 202 for detecting the presence or absence of the check P in the conveyance path K, (d) the measurement unit 203 for measuring the length L of the detected check P in the convey direction, (e) the stop unit 204 for stopping the conveyance of the check P by the conveyance unit 201 when the medium detection unit 202 detects the absence of the check P, (f) the read unit 205 for reading the information printed on check P using the MICR head 70 arranged along the conveyance path K path, and (g) the convey control unit 207 for continuing the conveyance of the check P by the conveyance unit 201 while the check P is being conveyed by the read unit 204 to read the printed information.

According to the magnetic ink reading device 50, it is possible to prevent the reading of the MICR characters from being stopped halfway.

The printer 10 according to the aforementioned embodiments includes (a) the housing 11 provided with the medium exit and entrance 12 for inserting and removing the check P printed with magnetic ink, (b) the conveyance unit 201 for reciprocating the check P inserted into the medium exit and entrance 12 along the conveyance path K provided in the housing 11, (c) the medium detection unit 202 for detecting the presence of the check P in the conveyance path K, (d) the measurement unit 203 for measuring the length L of the detected check P in the convey direction, (e) the stop unit 204 for stopping the convey of the check P by the conveyance unit 201 when the medium detection unit 202 detects the absence of the check P, (f) the read unit 205 for reading the information printed on check P using the MICR head 70 arranged along the conveyance path K path, (g) the convey control unit 207 for continuing the conveyance of the check P by the conveyance unit 201 and the reading of the check P by the read unit 205 when the check P is being conveyed for the read unit 208 to read the printed information, and (h) the print unit 208 performing printing on the check P in relation to the information read by the read unit 205.

According to the printer 10 according to the aforementioned embodiments, it is possible to prevent the reading of the MICR characters from being stopped halfway.

In the above-recited embodiments, the magnetic ink reading device 50 has the components of the printer 10 excluding the switching solenoid 32, the reversal motor 33, the inkjet head 91, the thermal head 92, the receipt conveyance motor 93, and the communication unit 35. However, the magnetic ink reading device 50 may have any other component or may not have any of the components as long as the magnetic ink reading device 50 is configured to read MICR characters.

In the above-recited embodiments, the print mechanism 90 including the inkjet head 91 is provided on the side opposite to the MICR head 70 across the conveyance path K. However, the print mechanism 90 and the MICR head 70 may be provided on the same side with respect to the conveyance path K.

In the above-recited embodiments, the inkjet head 91 is used as the print mechanism 90. Alternatively, the print mechanism 90 may print on the check P using a head other than the inkjet head 91 (e.g., a wire dot head).

In the above-recited embodiments, the print unit 208 performs printing on the check P the content related to the MICR characters read by the MICR head 70. However, any information unrelated to the read MICR characters may be printed on the check P.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic ink reading device, comprising:
   a housing having a slot through which a medium is inserted;
   a roller driven by a motor to convey the medium along a conveyance path in a conveyance direction;
   one or more sensors along the conveyance path at one or more sensor positions and configured to detect the medium at the one or more sensor positions;
   a magnetic head configured to read a magnetic pattern formed on the medium with magnetic ink; and
   a controller configured to:
      control the motor to convey the medium inserted through the slot,
      measure a length, in the conveyance direction, of the medium using outputs from the one or more sensors, and
      control the magnetic head to read the magnetic pattern on the medium while controlling the motor to continuously convey the medium for a period corresponding to the measured length.

2. The magnetic ink reading device according to claim 1, wherein, when the magnetic pattern is read, the medium is continuously conveyed for the period regardless of any outputs from the one or more sensors.

3. The magnetic ink reading device according to claim 1, further comprising:
   a magnetization mechanism disposed along the conveyance path, wherein
   the controller is further configured to control the magnetization mechanism to magnetize the magnetic pattern on the medium before reading the magnetic pattern.

4. The magnetic ink reading device according to claim 1, wherein
   the one or more sensors include a first sensor and a second sensor closer to the slot than is the first sensor, and
   the length is measured based on a first time when the first sensor detects the medium and a second time when the second sensor detects absence of the medium after the first time.

5. The magnetic ink reading device according to claim 4, wherein the measured length is calculated based on a known length between the first and second sensors and a conveyance speed of the medium along the conveyance path.

6. The magnetic ink reading device according to claim 4, wherein the medium is conveyed in a first direction along the conveyance path when the length is measured, and in a second direction opposite to the first direction along the conveyance path when the magnetic pattern is read.

7. The magnetic ink reading device according to claim 6, wherein the controller is further configured to cause the roller to convey the medium in the first direction when the second sensor detects the medium.

8. The magnetic ink reading device according to claim 6, wherein the controller is further configured to cause the roller to convey the medium in the second direction when the second sensor detects absence of the medium after the first sensor has detected the medium.

9. The magnetic ink reading device according to claim 6, wherein, when the magnetic pattern is read, the medium is continuously conveyed in the second direction for the period even when the first sensor does not detect the medium.

10. The magnetic ink reading device according to claim 1, wherein the magnetic head is located between two of the sensors along the conveyance path.

11. A printer, comprising:
a print head configured to print on a medium;
a housing having a slot through which the medium is inserted;
a roller driven by a motor by which the medium is conveyed along a conveyance path in a conveyance direction;
one or more sensors along the conveyance path at one or more sensor positions and configured to detect the medium at the one or more sensor positions;
a magnetic head configured to read a magnetic pattern formed on the medium with magnetic ink; and
a controller configured to:
control the motor to convey the medium inserted through the slot,
measure a length, in the conveyance direction, of the medium using outputs from the one or more sensors,
control the magnetic head to read the magnetic pattern on the medium while controlling the motor to continuously convey the medium for a period corresponding to the measured length, and
control the print head to print on the medium according to the magnetic pattern read from the medium by the magnetic head.

12. The printer according to claim 11, wherein, when the magnetic pattern is read, the medium is continuously conveyed for the period regardless of the outputs from the one or more sensors.

13. The printer according to claim 11, further comprising:
a magnetization mechanism disposed along the conveyance path, wherein
the controller is further configured to control the magnetization mechanism to magnetize the magnetic pattern on the medium before reading the magnetic pattern.

14. The printer according to claim 11, wherein
the one or more sensors include a first sensor and a second sensor closer to the slot than the first sensor, and
the length is measured based on a first time when the first sensor detects the medium and a second time when the second sensor detects absence of the medium after the first time.

15. The printer according to claim 14, wherein the measured length is calculated based on a known length between the first and second sensors and a conveyance speed of the medium along the conveyance path.

16. The printer according to claim 14, wherein the medium is conveyed in a first direction along the conveyance path when the length is measured, and in a second direction opposite to the first direction along the conveyance path when the magnetic pattern is read.

17. The printer according to claim 16, wherein the controller is further configured to cause the roller to convey the medium in the first direction when the second sensor detects the medium.

18. The printer according to claim 16, wherein the controller is further configured to cause the roller to convey the medium in the second direction when the second sensor detects absence of the medium after the first sensor has detected the medium.

19. The printer according to claim 16, wherein, when the magnetic pattern is read, the medium is continuously conveyed in the second direction for the period even when the first sensor does not detect the medium.

20. A method for controlling a magnetic ink reading device, the method comprising:
conveying a medium inserted through a slot of a housing along a conveyance path;
detecting the presence of the conveyed medium with one or more sensors along the conveyance path at one or more sensor positions;
measuring a length, in a conveyance direction, of the medium using outputs from the one or more sensors; and
reading a magnetic pattern on the medium using a magnetic head while continuously conveying the medium past the magnetic head for a period of time corresponding to the measured length.

* * * * *